(12) United States Patent
Buzanowski et al.

(10) Patent No.: US 7,976,800 B1
(45) Date of Patent: Jul. 12, 2011

(54) INTEGRATED EXHAUST GAS COOLING SYSTEM AND METHOD

(75) Inventors: Mark A. Buzanowski, Carrollton, TX (US); Sean P. McMenamin, Plano, TX (US)

(73) Assignee: Peerless MFG. Co., Dallas, TX (US)

( * ) Notice: Subject to any disclaimer, the term of this patent is extended or adjusted under 35 U.S.C. 154(b) by 0 days.

(21) Appl. No.: 12/654,738

(22) Filed: Dec. 30, 2009

(51) Int. Cl.
*B01D 53/34* (2006.01)
*B01D 53/74* (2006.01)

(52) U.S. Cl. .............. 423/210; 423/239.1; 423/247; 423/DIG. 6; 422/168; 422/169; 422/170; 422/171; 422/177; 422/180; 422/207

(58) Field of Classification Search ............ 423/210, 423/239.1, 247, DIG. 6; 422/168–171, 177, 422/180, 207
See application file for complete search history.

(56) References Cited

U.S. PATENT DOCUMENTS

| | | | |
|---|---|---|---|
| 7,069,716 B1 | 7/2006 | Childers | |
| 7,166,262 B2 | 1/2007 | Buzanowski | |
| 7,260,938 B2 | 8/2007 | Liebig | |
| 7,383,850 B2 | 6/2008 | Buzanowski | |
| 7,638,107 B1 * | 12/2009 | Wirt et al. | 423/239.1 |
| 7,722,844 B2 * | 5/2010 | Nakagawa et al. | 423/239.1 |

OTHER PUBLICATIONS

V.I. Parvulescu, P. Grauge, B. Delmon, "Catalytic Removal of NO," Catalysis Today, 46, 233-316, 1998.
M.A. Buzanowski, P.J. Burlage, Control Strategies for Selective Reduction (SCR) Systems, 15th Annual POWID/EPRI Controls and Instrumentation Symposium, Jul. 5-15, 2005, Nashville.

* cited by examiner

*Primary Examiner* — Timothy C Vanoy
(74) *Attorney, Agent, or Firm* — Andrews Kurth LLP

(57) ABSTRACT

An integrated exhaust gas cooling system and method, including an expansion joint linking the system to an upstream source of exhaust gas and a pre-oxidation section through which exhaust gas travels. A hot temperature zone in which the exhaust gas is maintained at a temperature optimal for an oxidation process extends through the pre-oxidation section. An oxidation catalyst in the hot temperature zone is provided. The exhaust gas passes through the oxidation catalyst. Oxidized exhaust gas passes a post-oxidation section downstream of the oxidation catalyst. A tempering air stream is injected into the post-oxidation section to create a cool temperature zone in which the oxidized exhaust gas is cooled below the temperature in the hot temperature zone and to a temperature optimal for a reduction process. The system includes a reduction catalyst in the cool temperature zone through which the oxidized exhaust gas passes.

18 Claims, 6 Drawing Sheets

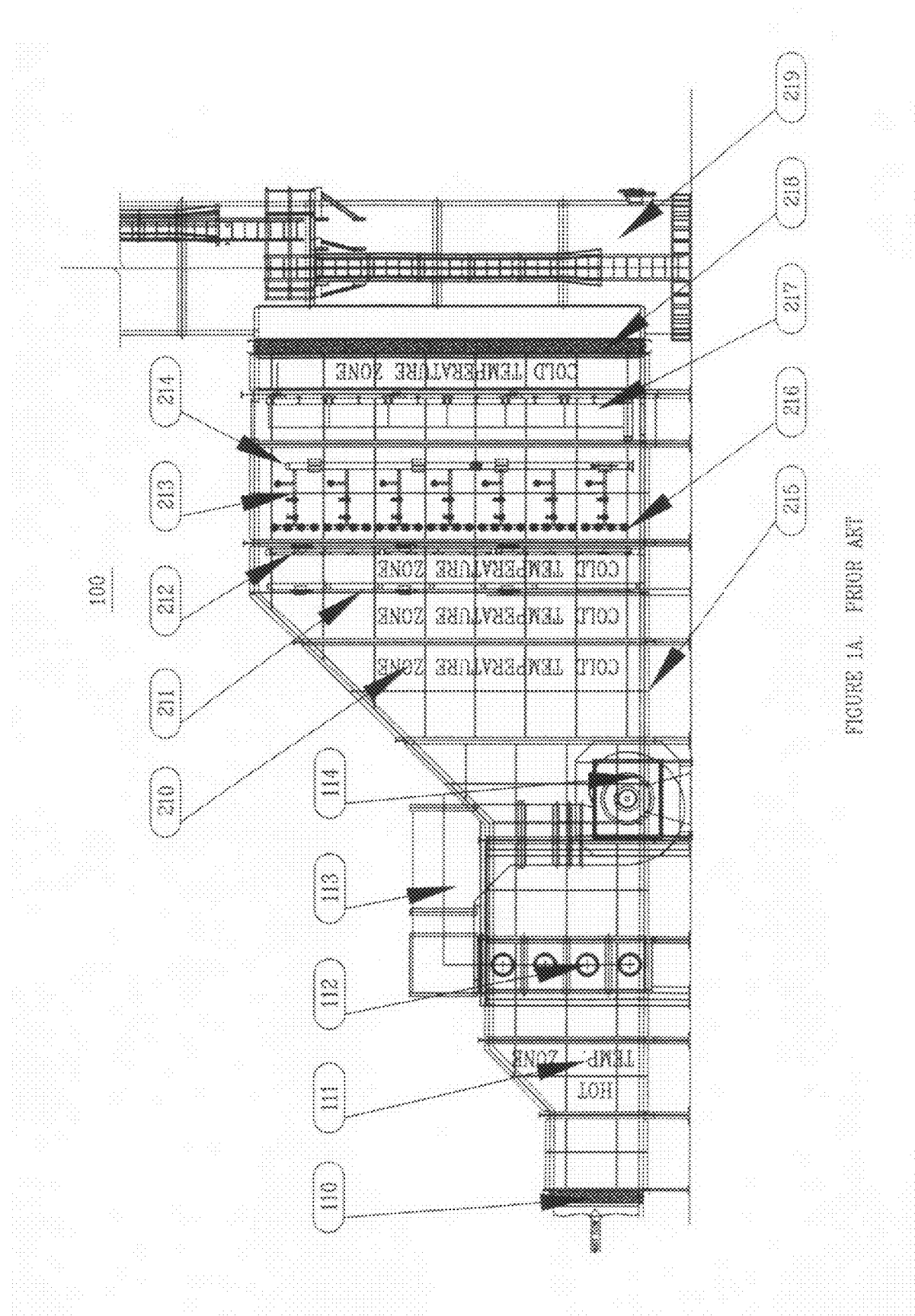

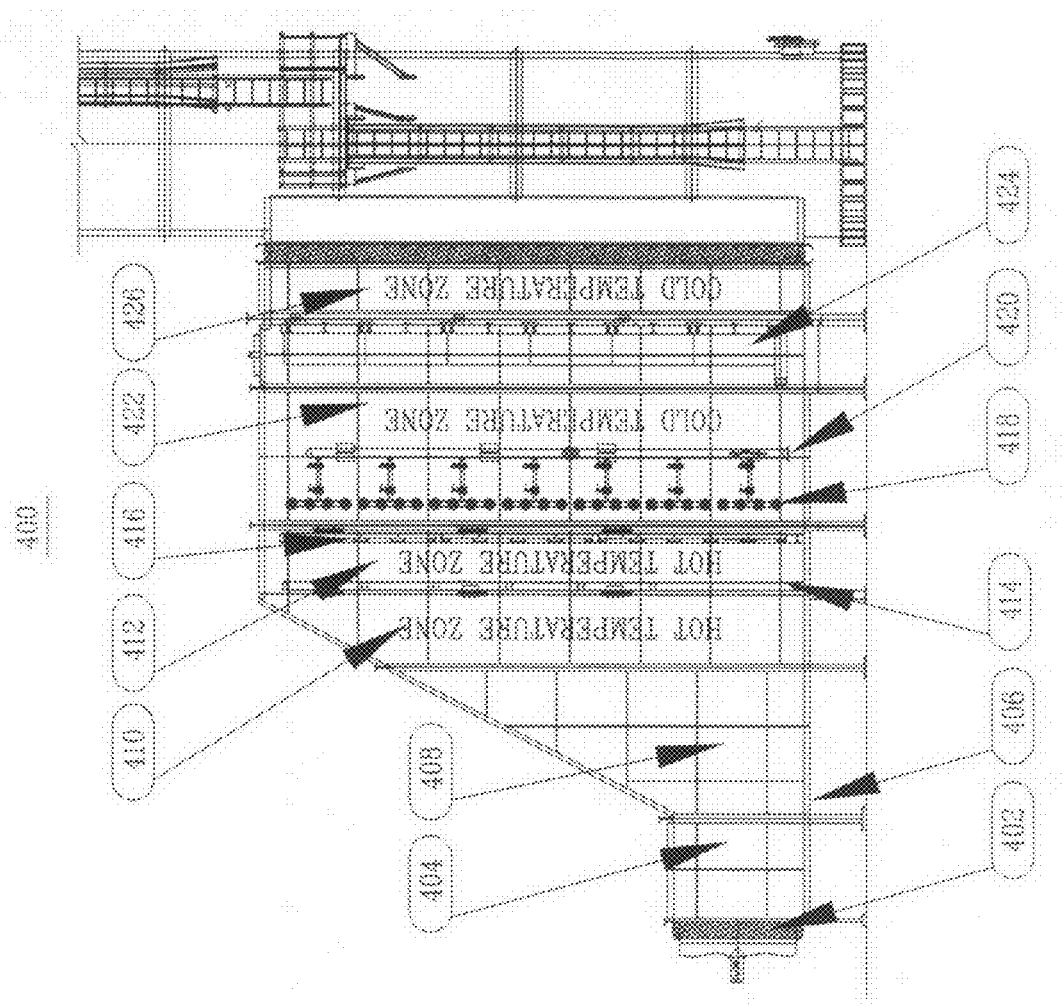

INTEGRATED EXHAUST GAS COOLING SYSTEM AND METHOD

FIELD

The field is gas turbines, and more specifically simple cycle gas turbine exhaust systems requiring cooling of high temperature exhaust gas for maintaining optimal performance of the emissions control catalysts.

BACKGROUND

A common issue for gas turbine power plants is the treatment of exhaust gases to comply with laws restricting pollutants present in the gases emitted into the ambient atmosphere. A common, commercially available gas turbine power plant is a simple cycle power plant. Simple cycle power plants are frequently utilized as peaking power plants which generate electricity typically during a high demand, known as peak demand. The critical features to meeting the peak demand are fast start/shut down and cyclic capabilities. In a simple cycle turbine ambient air is compressed and at high pressure mixed with fuel generating thermal energy in a turbine combustion chamber. The high temperature gas is expanded in the turbine and its energy is extracted and converted into mechanical work. Finally, the high temperature and low pressure exhaust gas leaves the gas turbine.

As a result of the combustion process, numerous species present in the fossil fuel and combustion air are oxidized. For instance, high combustion temperature accelerates oxidation of the atmospheric nitrogen that is present in the inlet combustion air and converts to oxides organically bound nitrogen-based species present in the fossil fuels. As a result, exhaust gas produced by gas turbines contains nitrogen oxides ($NO_x$) which consists primarily of nitric oxide (NO) and nitrogen dioxide ($NO_2$). After release, in the ambient atmosphere, NO is oxidized to secondary pollutants as $NO_2$ and organic nitrates which in turn trigger reactions producing ozone and other radicals. $NO_2$ is a toxic yellow-brown gas that is a major component of photochemical smog in urban areas, which contributes to formation of acid rain and is a precursor to low-level ozone formation. A detailed discussion of the NO role in photochemistry of the troposphere and stratosphere is given by V. I. Parvulescu at al., "Catalytic Removal of NO," Catalysis Today, 46, 1998, 233-316.

In addition to formation of $NO_x$, the combustion process generates numerous other oxides, some of which are produced as a result of partial oxidation of fuels in the combustion zones with reduced availability of oxygen ($O_2$). An example of these oxides is carbon monoxide (CO) that is a very stable molecule and highly toxic to humans.

Typical concentrations of $NO_x$ and CO in the raw turbine exhaust gas are in the range of about 10 to 100 ppmvdc (parts per million by volume, on a dry or water-free basis, corrected to 15 percent oxygen) depending on the type and mode of the simple cycle turbine operation. However, the US government agencies and local environmental authorities have established emission limits for $NO_x$ that are typically in the range from below 2 to 5 ppmvdc. It is, therefore, necessary to reduce the $NO_x$ concentration in the exhaust gas before it can be released to the atmosphere. The limits established for CO emissions may require over 90 percent reduction of raw emission levels. Typically the air permit for plant operation states the allowable emission levels for pollutants present in the exhaust gas. To comply with these regulations the raw emissions of $NO_x$, CO, unburned hydrocarbons (UHC), volatile organic carbons (VOC) and other regulated pollutants must be reduced and maintained below the permitted values.

Whereas many techniques have been developed for reduction of emissions by modifying turbine combustion characteristics, only post-combustion exhaust gas cleaning technologies are capable of reducing $NO_x$, CO, UHC and VOC concentrations below 5 ppmvdc. To comply with environmental standards simple cycle power plants are equipped with catalytic systems to reduce concentration of CO, UHC, VOC, $NO_x$ and other hazardous components present in the exhaust gas. The catalytic treatment of the exhaust flue gas is generally considered as a Best Available Control Technology (BACT) that represents the most stringent emissions control process to be technologically feasible and cost effective.

Such catalytic treatment of pollutants requires systems with substantial footprints to accommodate the emissions control catalysts, such as seen in FIG. 1. Moreover, in order to efficiently treat the exhaust gas for different emissions, the temperature of the exhaust gas must be controlled for optimal catalyst performance and capital and operating cost effectiveness. The existing designs utilize ambient air (so called tempering air) injection systems to reduce the exhaust gas temperature. The exhaust gas is cooled down mainly to reduce operating temperature of the emission control catalysts. However, different catalysts developed to control CO, UHC, VOC and NOx operate efficiently at different operating temperatures. Consequently, maintaining one range of exhaust gas temperature for all catalysts by pre-cooling exhaust gas leaving the turbine results in inefficiency of catalytic processes and high exhaust gas pressure drop. This also increases the footprint required for the exhaust system.

Accordingly, there is a need to develop a compact exhaust system and efficient tempering air arrangement for simple cycle turbines, and other similar combustion systems, minimizing capital and operating costs and maximizing efficiency of the emissions control catalysts.

SUMMARY

Embodiments of an improved, integrated exhaust gas cooling system and method overcome disadvantages related to energy inefficiency, lower catalyst performance, and large exhaust system footprint. In an embodiment, the system includes an expansion joint linking the integrated exhaust gas cooling system to an upstream source of exhaust gas and a pre-oxidation section equipped with a flow straightening device through which exhaust gas travels. A hot temperature zone in which the exhaust gas is maintained at a temperature in a temperature range that is optimal for an oxidation process extends through the pre-oxidation section. The system further includes an oxidation catalyst placed in the hot temperature zone extending from the pre-oxidation section and downstream from the pre-oxidation section up to a tempering air injection point. The exhaust gas passes through the flow straightening devices and the oxidation catalyst. The system includes a post-oxidation section downstream of the oxidation catalyst and through which the oxidized exhaust gas passes. A tempering air stream is injected into the post-oxidation section to create a cool temperature zone that extends through the post-oxidation section and in which the oxidized exhaust gas is cooled below the temperature in the hot temperature zone and to a temperature in a temperature range that is optimal for a reduction process. The system includes a reduction catalyst, in the cool temperature zone extending from the post-oxidation section and downstream from the post-oxidation section. The oxidized exhaust gas passes through the reduction catalyst.

An embodiment of an improved, integrated exhaust gas cooling method includes receiving hot exhaust flue gas, transitioning hot exhaust flue gas into pre-oxidation section of exhaust system, passing hot exhaust flue gas through oxidation catalyst, injecting tempering air stream, provided by tempering air blower, into post-oxidation section of exhaust system downstream from oxidation catalyst to provide a cold temperature zone in which oxidized exhaust flue gas is cooled to a temperature optimized for reduction process, and passing cooled, oxidized exhaust flue gas through reduction catalyst. The temperature of oxidized exhaust flue gas passing through reduction catalyst is less than temperature of exhaust flue gas passing through oxidation catalyst by virtue of injection of tempering air stream into post-oxidation section of exhaust system. The tempering air stream injection may occur at multiple stages through pre- and post-oxidation section of the exhaust duct. The method emits clean exhaust gas in which some of its components, as e.g., CO, are oxidized and some of its components, as e.g., $NO_x$, are reduced through stack into the ambient atmosphere.

DESCRIPTION OF THE DRAWINGS

The detailed description will refer to the following drawings, wherein like numerals refer to like elements, and wherein:

FIG. 1A is a diagram providing an elevation view of a prior art arrangement for an exhaust system for simple cycle power plants

FIG. 2 is a diagram providing an elevation view of an embodiment of an improved, integrated exhaust gas cooling system.

DETAILED DESCRIPTION

Figure 1B:
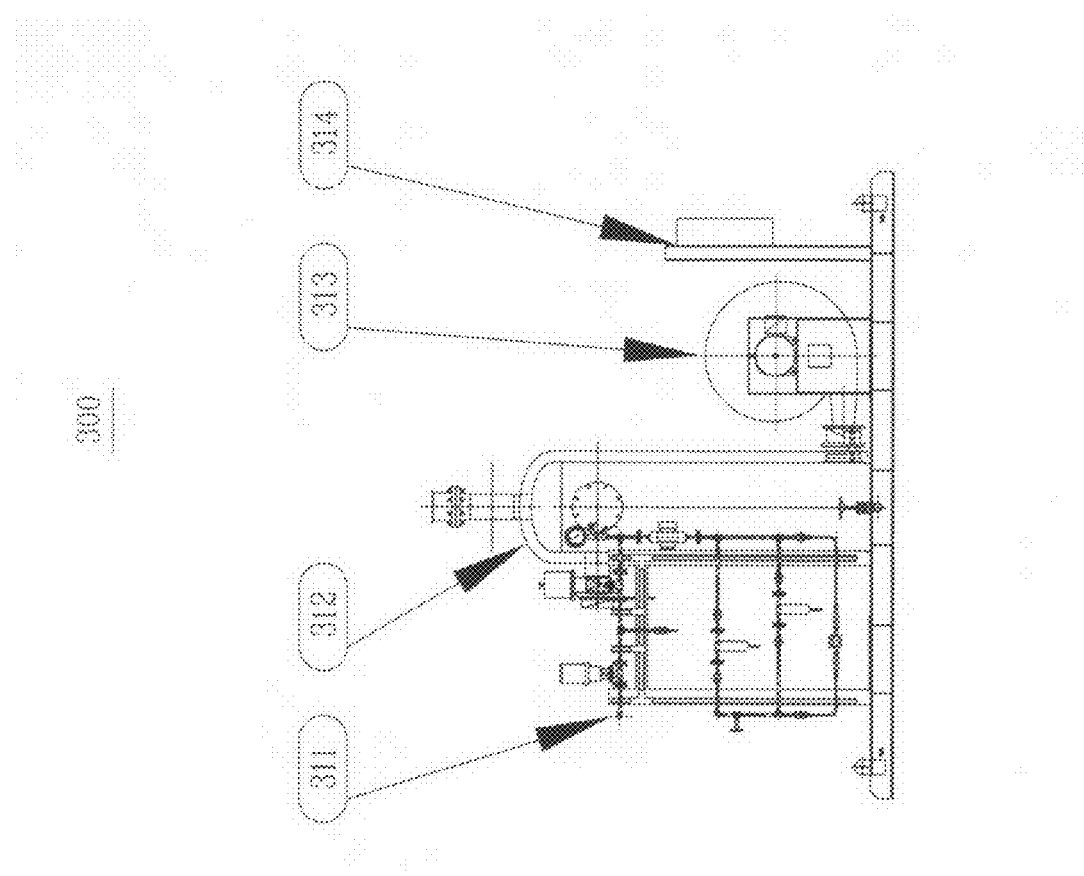
FIG. 1B is a diagram providing an elevation view of a prior art arrangement of a reagent evaporation and flow control skid.

Described herein are embodiments of an improved, integrated exhaust gas cooling system and method. The system and method may be utilized to cool and treat exhaust gases from, e.g., single cycle power plants. The embodiments described herein provide a compact exhaust system and tempering air arrangement for simple cycle turbines, and other similar systems, minimizing capital and operating costs and maximizing efficiency of the emissions control catalysts. The embodiments described herein may be used in other similar power plant and other exhaust producing combustion systems.

With reference now to FIG. 1A, shown is a prior art exhaust system 100 that is typical of current systems used to treat exhaust emissions. The exhaust gas leaves, e.g., the gas turbine system, and enters the exhaust system 100 through expansion joint 110. A conventional arrangement of the exhaust system 100 required to house equipment for treating the exhaust gas of simple cycle gas turbines is shown in FIG. 1A. Main components of the exhaust system 100 include turbine exhaust expansion joint 110, connection spool for injecting cooling air 111, tempering air blower 114, tempering air supply duct 113, tempering air injection and distribution system 112, expansion duct 210, perforated plate 211, emissions control catalysts 212 and 217, reagent supply manifold 214, reagent flow control take-offs 213, reagent injection grid 216, exhaust duct expansion joint 218 and stack 219.

In a preferred arrangement of a catalytic system to control emissions of CO, UHC and VOC, catalyst 212 is a noble metal plated catalyst that promotes oxidation of these compounds, and will be referenced as the oxidation catalyst 212.

Nitrogen oxides are another type of pollutant the emissions of which must be controlled. There are several commercially developed processes for $NO_x$ emissions control. One of the most efficient technologies is the Selective Catalytic Reduction (SCR) process that is capable of over 95 percent reduction of raw $NO_x$ emissions emitted from the turbine.

Different arrangements and controls of commercial SCR systems are discussed by M. A. Buzanowski and P. J. Burlage "Control Strategies for Selective Catalytic Reduction (SCR) Systems," 15th Annual POWID/EPRI Controls and Instrumentation Symposium, July 5-15, Nashville, Tenn., 2005, which is incorporated herein by reference. In a typical arrangement, the SCR process involves the use of emissions control catalyst 217 to treat the exhaust gas as the gas passes through a SCR reactor. This catalyst will be referenced as the reduction catalyst 217. Injection of a reagent into the exhaust gas upstream of the catalyst bed is required to facilitate nitrogen oxides' decomposition. The reagent reacts with $NO_x$ on the catalyst surface and reduces $NO_x$ to nitrogen ($N_2$) and water ($H_2O$) molecules.

There are a number of known $NO_x$ reducing agents. A commonly used $NO_x$ reducing agent (reagent) is ammonia ($NH_3$). One of three (anhydrous ammonia, aqueous ammonia, and urea) can be used to provide the required ammonia for the SCR reaction. While the reagent selection does not have considerable impact on the reduction catalyst 217 performance, it significantly affects the controls, design, operation, and cost of the system. Regardless of which ammonia precursor is employed the reducing agent must be diluted for several reasons, e.g., to increase the required volume of the reducing agent in order to properly distribute ammonia within ductwork or to maintain ammonia concentration below its explosive limits that may exist when ammonia is concentrated and exposed to high temperatures.

With reference now to FIG. 1B, shown is a prior art ammonia evaporation and flow control skid 300. To increase the required volume, ammonia may be diluted utilizing carrier gas supplied by an especially installed for this purpose blower 313. Ammonia flow is controlled utilizing ammonia supply system 311 equipped with filters, flow control and shut-off valves. In the case of utilizing aqueous ammonia a vaporizer 312 is required to generate ammonia vapors. The required heating media is provided by re-circulating hot exhaust gas or by heating ambient air. In any case, the dilution blower 313 provides the required dilution/heating media flow to evaporate liquid ammonia or to dilute ammonia vapors for the systems fed by anhydrous ammonia. The blower 313 controls are located in the local control panel 314. There are other possible arrangements. For example, heat exchangers can be utilized to evaporate aqueous ammonia that also may require employing the dilution media flow provided by blower 313. The requirement of diluting ammonia vapors, and consequently to utilize a dedicated dilution blower 313, causes increased capital and operating cost of the SCR system.

The reaction stoichiometry and the SCR reaction rate varies depending whether or not NO, $NO_2$, or both NO and $NO_2$ are present in the exhaust gas (see, e.g., a detailed discussion given by Buzanowski in the U.S. Pat. No. 7,166,262, which is incorporated by reference). The slowest reaction occurs when only $NO_2$ is present in the exhaust gas. The reaction stoichiometry when only NO, $NO_2$ or both NO and $NO_2$ are present in the exhaust gas can be expressed by the following reactions (fwdarw represents an arrow pointing forwards as in chemical reactions):

$$4NO+4NH_3+O_2 \text{.fwdarw.} 4N_2+6H_2O \quad (1),$$

$$NO+NO_2+2NH_3 \text{.fwdarw.} 2N_2+3H_2O \quad (2),$$

$$2NO_2+4NH_3+O_2 \text{.fwdarw.} 3N_2+6H_2O \quad (3).$$

The reaction rate of the reaction (1) or (2) is fast and preferable for the SCR reaction. It should be noted that if the concentration of $NO_2$ exceeds 50 percent of $NO_x$ the reaction stoichiometry changes to the reaction (3) that is much slower and requires more catalyst and ammonia then the reaction (1) or (2).

With continuing reference to FIG. 1A, ammonia precursor is injected into the flue gas utilizing ammonia injection grid (AIG) 216. Typically, the AIG 216 is located at a sufficient distance upstream of the SCR catalyst 217 to facilitate reagent distribution and homogeneous mixing with the exhaust gas components. Because the ammonia reagent can be oxidized when exposed onto oxidation catalyst, typically the AIG 216 is located downstream of the oxidation catalyst.

For any catalytic reactor system and for commercial large scale catalyst reactors in particular, to efficiently use catalyst volume the inlet parameters as flow, temperature, concentration of the exhaust gas components must be uniformly distributed across the face of the catalyst.

Typical requirements for the oxidation and reduction catalysts require that the exhaust flue gas velocity must be uniformly distributed across ductwork with root mean square (RMS) deviation typically less then 15 percent of the mean velocity. In addition, the exhaust flue gas temperature distribution at the inlet to the oxidation catalyst is typically restricted to +/−10 degree F. of the given design bulk average temperature face and at the same time typically should not to exceed +/−25 degree F. absolute temperature mal-distribution at the catalyst face.

Different measures are proposed to achieve high homogeneity of the exhaust gas. To achieve the required uniformity of the exhaust gas velocity flow straightening devices are installed in the exhaust system of the simple cycle power plants. Typically turning vanes and/or perforated plates 211 are utilized. Perforated plates are not very efficient in increasing uniformity of the exhaust gas temperature. Whereas perforated plates reduce velocity mal-distribution, at the same time they remove energy from the exhaust flue gas by imposing pressure drop and reduce efficiency of the simple cycle power plant. The degrading effects of pressure loss may be magnified in case when perforated plate is exposed to higher flows. It is thus beneficial to restrict incoming flow to the perforated plate in order to minimize system pressure losses.

In a typical configuration of the exhaust system, the exhaust gas enters tempering air injection system section followed by the perforated plate, the oxidation catalyst, the ammonia injection grid, and the reduction catalyst.

With continuing reference to FIG. 1A, the oxidation catalyst 212 is capable of operating at 1200 degrees F. However, the reduction catalyst 217, depending on the active component chemical formulation and substrate, is typically utilized at about 850 degrees F. and the operating temperature cannot exceed 1050 degrees F. for prolonged periods of time. This temperature restriction prevents instable operation and in some cases sintering of the porous catalyst material, and consequent closing of the micro-pores and reduction of available surface area for the SCR reaction to proceed, that would occur above 1050 degrees F. In contrast, due to different chemical composition of the active components and substrate the oxidation catalyst 212 is stable and the sintering effects are minimized at this temperature range. Since the exhaust flue gas temperature at most power loads exceeds the temperate range required by the reduction catalyst the exhaust flue gas must be cooled down. Consequently, in a typical application, simple cycle gas turbines (frame or aero-derivative) require air blowers 114 for injecting ambient air (tempering air) into the exhaust system to bring the exhaust temperature within the operating range of the reduction catalyst. Since the exhaust gas flow increases due to the external injection of tempering air, the ratio of the external injection to exhaust flow should be minimized upstream of the perforated plate in order to reduce overall system pressure losses.

In the prior art, tempering air is injected into an especially allocated section of the duct 111 of the exhaust system 100. Ambient air is supplied and compressed utilizing tempering air fans 114. The compressed air is transferred through interconnecting ducting 113 and connected with the tempering air distribution housing. Tempering air is introduced into the exhaust system 100 via especially designed injection nozzles or injection holes 112. The required total flow of the tempering air is injected in one or multiple stages at one location; downstream of the turbine generating exhaust gas and upstream of the perforated plate/catalyst(s) section (211-217) of the exhaust system 100.

The hot exhaust gas passes the injection nozzles 112 at high velocity. Whereas the exhaust gas temperature is relatively uniform localized injection of ambient air causes mal-distribution in temperature and oxygen profiles. As a result, additional mixing distance is needed for mixing tempering air and exhaust flue gas. In addition, this type of injection requires extended ductwork, as shown in FIG. 1A and consequently increases foundation cost and the cost of ducting due to the increase of the exhaust system 100 envelope.

Considering the oxidation catalyst 212, a high efficiency of CO conversion is achieved above 600 degrees F. and the oxidation catalyst 212 is capable of achieving over 90 percent efficiency up to 1200 degrees F. However, below 600 degrees F. the efficiency quickly deteriorates and the oxidation catalyst 212 is capable of oxidizing only about 70 percent CO at 500 degrees F., which is considered as a minimum operating temperature. The conversion of UHC is also highly dependent on the operating temperature and the type of unburned hydrocarbon present in the exhaust gas. Depending upon butane, propane or ethane presence in the exhaust gas, the conversion efficiency increases with temperature. However, less then 25 percent efficiency is expected at 600 degrees F. Considering VOC, the minimum operating temperature is approximately 500 degrees F. Similarly to the conversion of CO and hydrocarbons, the VOC removal efficiency rate increases with increase of the operating temperature. As a result, there is a temperature window for the efficient utilization of the oxidation catalyst 212 ranging from low efficiency utilization at 500 degrees to high efficiency utilization starting at 700 to 1200 degrees F. In general, the oxidation catalyst 212 achieves higher efficiency when placed and utilized in a higher temperature zone and excessive cooling of incoming exhaust gas is not beneficial.

With continuing reference to FIG. 1A, in the prior art injection of tempering air was deemed required to reduce the exhaust gas temperature assuming that if the exhaust gas temperature remained unaltered, the catalyst's performance and longevity would be reduced. However, such characteristics are applicable only to a specific form of a catalyst for which there is a maximum allowable operating temperature. Exceeding this temperature causes catalyst performance deterioration. Having a combination of oxidation/reduction catalysts located downstream of the tempering air injection point where one type of catalyst (reduction) requires cooling of the exhaust gas temperature that in turn decreases the efficiency of the other catalyst (oxidation), exposing both catalysts to lower operating temperatures causes overall system inefficiency. As a result, by reducing the exhaust gas temperature, the efficiency of the oxidation catalyst 212 is reduced.

Furthermore, the oxidation catalyst 212 is not selective to only oxidize CO, UHC and VOC, but also oxidizes, among other compounds, NO (to $NO_2$). The oxidation of NO is not desirable because when the ratio of $NO_2$ exceeds 50 percent of $NO_x$, the catalytic reduction of nitrogen oxides proceeds less efficiently at low values of the reaction rates. In this case to compensate for the loss of efficiency additional catalyst volume must be added to achieve the required catalyst performance. This, in turn, results in increased capital cost and higher pressure drop. Also, because more $NO_2$ is present in the exhaust gas its concentration may exceed 50 percent of $NO_x$ and additional ammonia must be supplied based on the reaction (3) referenced above.

The oxidation of NO is highly dependent on the operating temperature. At low operating temperatures (500 degrees F.) more NO is converted to $NO_2$ than at high operating temperatures (1000 degrees F.). This ratio may be significant; at 950 degrees F. about 20 percent of $NO_2$ may exist in $NO_x$ whereas at 600 degrees F. the $NO_2$ ratio may exceed 60 percent (of the $NO_x$ present). It is, therefore, highly beneficial to place and operate the oxidation catalyst 212 at the highest possible operating temperatures considering not only increased catalyst efficiency (higher CO oxidation rates) but also lower oxidation of NO to $NO_2$.

Furthermore, upstream of the perforated plate/catalyst (211-217), the internal pressure of the exhaust gas which the tempering air tempering air fan 114 must overcome is the highest. Consequently, the capacity of the tempering air fan 114 must be enlarged, causing increased consumption of electric power feeding the tempering air fan 114. Minimizing the amount of cooling air being injected upstream of the perforated plate/catalyst (211-217) would decrease the operational costs of the exhaust system.

Furthermore, tempering air blowers 114 are selected based on the required flow and static pressure requirements. The requirement of providing sufficient tempering air flow is determined based on the maximum flow and temperature of exhaust gas. A significant volume of tempering air flow must typically be injected to reduce temperature of the exhaust gas at maximum load. However, the demand for tempering air changes in the wide range. As power plant load changes and the exhaust gas temperature and flow changes the blower's capacity must be altered. It is especially important for simple cycle turbines that frequently cycle and change load drastically. Because of the limited capability to reduce tempering air blower's flow, at a minimum load of a simple cycle power plant, too much flow of tempering air may be injected, causing not only severe mal-distribution in flue gas components but also reducing flue gas temperature below the required minimum value restricted by the lower temperature limit for operating emission control catalysts. For instance, at partial loads, the amount of tempering air may be sufficiently high that temperature of exhaust gas falls below minimum operating temperature for the oxidation catalyst 212, e.g., below 400 degree F. whereas this temperature is still sufficient for efficient operation of the reduction catalyst 217. To prevent this occurrence tempering air blowers 114 must be equipped with expensive variable frequency drives or inlet by-pass dampers with associated controls to restrict amount of tempering air injected into ductwork, however these devices require special controls, and increase capital and operating costs.

In U.S. Pat. No. 7,069,716 by Childers, tempering air is injected into a circular interconnecting duct utilizing specially designed injection nozzles for distribution of cooling air. The interconnecting duct is located between the turbine engine and the emissions control catalyst. The cooling air cools-down the exhaust gas temperature prior to entering any catalyst. It was taught that cooling of the exhaust gas is required to maintain performance characteristics of catalysts and when unaltered, the temperature of the exhaust gas is excessive high which ruins the catalyst's effectiveness. The location for the injection of tempering air taught by Childers is not optimal when both the oxidation and reduction catalysts are installed downstream of the tempering air injection point.

A similar location for the injection of tempering air was disclosed by Liebig (see U.S. Pat. No. 7,260,938). The proposed method includes by-passing of the controlled portion of exhaust gas in combination with injection of tempering air. Also in this case tempering air is injected upstream of any emission control catalyst. The author also disclosed reagent injection system for which reagent is mixed with tempering air and injected upstream of the technological process. This type of supply of the reagent is not applicable for simple cycle power plants equipped with the oxidation catalyst. In Liebig's arrangement, the reagent would be oxidized when entering the oxidation catalyst prior to entering the reduction catalyst.

In the prior art, the tempering air distribution apparatus is located between the turbine engine and the one or more downstream catalyst. The inventors discovered that this location: is not beneficial considering overall system pressure losses; increases oxidation of nitric oxide; additional consumption of the ammonia reagent; additional catalyst volume, increases energy consumption by tempering air blowers, and, reduces the efficiency and overall performance of the oxidation catalyst.

Figure 3:
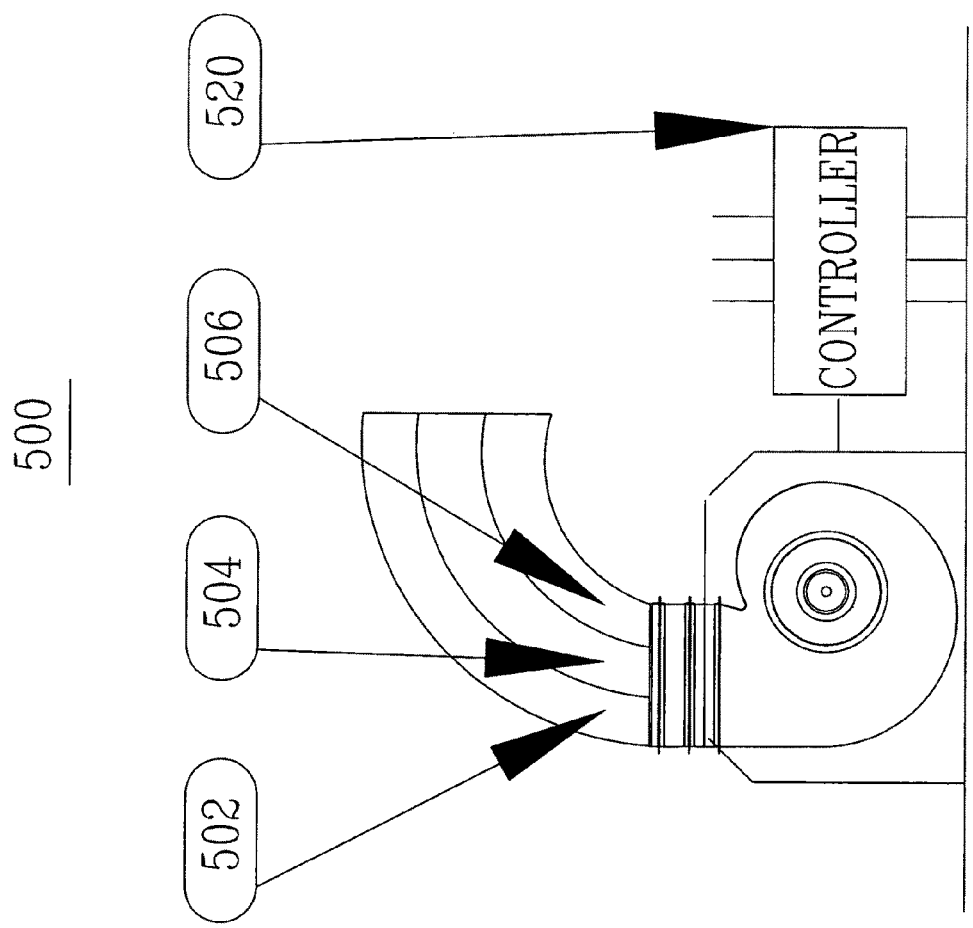
FIG. 3 is a diagram providing an elevation view of an embodiment of an arrangement of tempering air blowers that may be used with embodiments of the improved, integrated exhaust gas cooling system.
Figure 4:
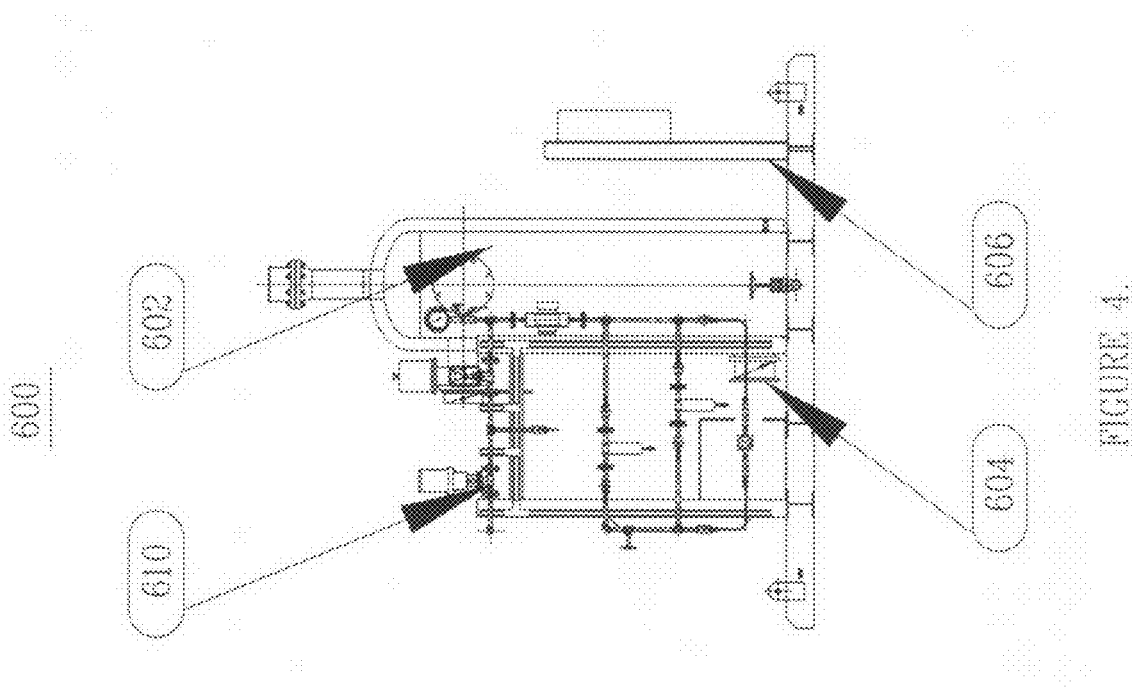
FIG. 4 is a diagram providing an elevation view of an embodiment of an improved arrangement of a reagent evaporation and flow control skid that may be used with embodiments of the improved, integrated exhaust gas cooling system.

With reference now to FIG. 2, shown is a schematic diagram of an embodiment of integrated exhaust cooling system 400. System 400 includes tempering and dilution air features that overcome disadvantages of the prior art systems described with reference to FIGS. 1A and 1B. System 400 includes an expansion joint 402, an inlet transition duct 404, a first transition duct section 408, a second transition duct section 410, a pre-oxidation section 412, a perforated plate 414, an oxidation catalyst 416, an ammonia injection grid 418, a manifold 420, a post-oxidation section 422, a reduction catalyst 424, and a post-reduction section 426. As shown in FIGS. 3 and 4, system 400 may also include a tempering air blower 500 and the ammonia reagent evaporation and flow control skid 600.

System 400 is described for use with simple cycle gas turbines. However, simple cycle gas turbines are used for reference and example only. Other types of combustion systems may benefit from the integrated exhaust cooling system 400. For example, system 400 may be used in conjunction with combustion boilers, process heaters and other combustors requiring cooling of exhaust gas.

With continuing reference to FIG. 2, hot exhaust flue gas, e.g., from a simple cycle turbine is discharged into exhaust system 400 through an expansion joint 402. The expansion joint 402 links the turbine system and ducting of the exhaust system 400. Passing through the expansion joint 402, the exhaust gas temperature is typically about 1150 degrees F. Consequently, a hot temperature zone exists at the inlet transition duct 404 of the exhaust system 400. The exhaust system 400 ductwork defines a generally horizontal exhaust gas path 406. The hot exhaust gas is directed by the inlet transition duct section 404 to the first transition duct section 408 and the section transition duct section 410 of the exhaust system. In transition sections 408 and 410, the exhaust gas flow is expanded and the exhaust gas flow velocity is reduced. Eventually, the exhaust gas flow velocity reaches a minimum at the maximum exhaust duct cross-section area 412. A hot temperature zone exists in the first transition section 408 and the second transition section 410, as indicated in FIG. 2. This hot temperature zone is located between the expansion joint 402 and the perforated plate 414.

Leaving the second transition duct section 410 hot exhaust gas enters perforated plate 414. The perforated plate 414 is typically utilized to normalize the flue gas velocity profile. Consequently, a variety of perforated plates 414 designs, known to those of skill in the art, may be used. The perforated plate 414 preferably is installed at the location where the cross-section of the duct reaches maximum area (maximum cross-section exhaust duct section 412), as illustrated in FIG. 2. However, the perforated plate 414 may be installed at other locations in the transition sections 408, 410 of the exhaust system 400. Additionally, one or multiple perforated plates 414 may be located in the transition sections 408, 410. A hot temperature zone exists upstream (to the left in FIG. 2) and downstream (to the right in FIG. 2) of the perforated plate 414.

In the prior art, as described above, the total flow of tempering air was injected upstream of the perforated plate. With continuing reference to FIG. 2, however, in the embodiment shown, tempering air is injected fully downstream of the perforated plate(s) 414 (e.g., in the post-oxidation section 422) or substantially downstream of perforated plate(s) 414 (e.g., partially into transition section 410, pre-oxidation section 412, and/or post-oxidation section 422 or various combinations of theses sections). As a result, the exhaust gas temperature and the homogeneity of the exhaust gas temperature is better preserved. Also, the overall system 400 pressure drop is lowered and the corresponding operating costs are reduced. Since the transition sections 408, 410 of the exhaust system 400, previously allocated in the prior art for injection of the tempering air, are reduced in size, the overall dimensions of the exhaust system 400, including foundations, are minimized. This reduction in size and foundation footprint results in a significant reduction of capital costs.

The exhaust gas leaving the perforated plate 414 enters the pre-oxidation section (or third transition section) 412, which is defined as the area separating the perforated plate 414 and the oxidation catalyst 416. A hot temperature zone (the exhaust gas temperature at the oxidation catalyst 416 is greater then temperature at the reduction catalyst) exists between the perforated plate 414 and the oxidation catalyst 416. As shown in FIG. 1, the zone immediately upstream of the oxidation catalyst in prior art systems was a cold temperature zone (i.e., because of injection of tempering air prior to oxidation catalyst, the gas temperature here was substantially cooler than exhaust gas temperature entering exhaust gas system 100). Maintaining the hot temperature zone immediately upstream of the oxidation catalyst 416 in pre-oxidation section 412 increases the efficiency of the oxidation catalyst 416 and minimizes generation of $NO_2$ in the exhaust gas. Furthermore, the demand for the reagent required to decompose NO is reduced because of lowered generation of $NO_2$ in the exhaust gas by the oxidation process. In addition, problems with the oxidation catalyst 416 overcooling by supplying excessive amounts of tempering air at partial loads are eliminated.

With continuing reference to FIG. 2, passing through and leaving the oxidation catalyst 416, the exhaust gas is mixed with a reagent (e.g., ammonia reagent) as required for the reduction catalyst. For example, ammonia vapors are mixed with a dilution media and supplied into the exhaust gas utilizing ammonia injection grid 418 and manifold 420. If ammonia vapors are obtained by evaporating aqueous ammonia, the ammonia reagent must be vaporized prior to injection into the exhaust system 400. Ammonia vapor is transferred to the manifold 420 and re-distributed inside the exhaust system 400. In the embodiment shown, the vaporized ammonia is injected into the exhaust system utilizing an ammonia injection grid 418. It is preferable to utilize injection grids allowing a low injection pressure drop and improved turbulence mixing as, e.g., grid disclosed by Buzanowski et. al., in U.S. Pat. No. 7,383,850, which is hereby incorporated by reference.

In the embodiment shown, tempering air is injected into the exhaust gas system 400 in the post-oxidation section 422. For example, the tempering air may be injected into the exhaust gas system 400 through the ammonia injection grid 418. This enables the adjustment of the tempering air flow proper to the temperature and flow distribution inside the exhaust system 400. As a result of injecting tempering air into the exhaust system 400 in the post-oxidation section 422, the temperature of the exhaust gas is lowered and a cold temperature zone is created in the post-oxidation section 422 between the oxidation catalyst 416 and the reduction catalyst 424. The tempering air may be injected, e.g., through the manifold 420, or utilizing a separate manifold or manifolds. The exhaust gas leaving the reduction catalyst 424 maintains cold temperature zone in the post-reduction section 426. The temperature in the cold temperature zone in the post-reduction section 426 may be slightly higher then in the cold temperature zone in the post-oxidation section 422 due to exothermic reaction occurring between ammonia and nitrogen oxides. However, the temperature in both of the cold temperature zones in sections 422 and 426 will be lower than the temperature in the hot temperature zones in the pre-oxidation section 412 due to the injection of tempering air in the post-oxidation section 422.

With reference now to FIG. 3, schematically illustrated is another component of embodiments of exhaust system 400, tempering air blower 500. In embodiments, tempering air stream(s) is provided by tempering air blower 500. Tempering air blower 500 may include features of tempering air blower 114 described above; for example, tempering air blower 500 may include a blower and intake that intakes and compresses ambient air in order to provide tempering air streams. Tempering air blower 500 may split tempering air stream into multiple tempering air streams 502, 504, and 506, as shown. For example, tempering air blower 500 may have multiple outlets (e.g., multiple ducts or tubes), each corresponding to and providing one of the multiple tempering air streams 502, 504, and 506. In an embodiment, one of the tempering air streams 502 is directed to the exhaust system 400 to provide the required tempering air to reduce the exhaust gas temperature. As described above, preferably, all of the required tempering air is injected downstream of the oxidation catalyst 416 to maintain a hot temperature zone in the pre-oxidation section 412 and through the oxidation catalyst 416 and to provide a cold temperature zone through the reduction catalyst 424. Accordingly, duct work and/or tubing providing tempering air stream 502 may be, e.g., connected to manifold 420, or other, separate manifold, and injected into post-oxidation section 422 (e.g., through ammonia injection grid 418 or other injection device). Ammonia injection grid 418, manifold 420 and/or tempering air blower 500 may include appropriate valves to adjust and control flow of tempering air stream into exhaust system 400. As noted above, however, the tempering air stream 502 may be additionally split and injected at different locations of the exhaust system 400.

In order to control temperature distribution in the exhaust system 400, exhaust system 400 may further include a controller 520 which controls tempering air blower 500 and which is in communication with sensors in the temperatures zones in sections 410, 412 and 414. The tempering air stream 502 that is injected into these sections may be appropriately adjusted by controller 520 to achieve the required exhaust gas temperature distribution. In the exhaust system 400, such control enables the oxidation catalyst 416 operates at higher temperature then the reduction catalyst 426. Indeed, controller 520 may operate to control tempering air blower 500 to inject tempering air stream(s) 502 into exhaust system 400 so that temperature of exhaust gas in hot temperature zone in pre-oxidation section 412, and through oxidation catalyst 416, is at a temperature that maximizes efficiency of the oxidation process of the oxidation catalyst 416 and so that temperature of exhaust gas in cold temperature zone of post-oxidation section 422, and through reduction catalyst 426, is at a temperature that maximizes efficiency of the reduction process of the reduction catalyst 426. Temperature may also be so controlled to avoid sintering of the catalysts. Such temperatures may be determined from the ranges described above with reference to FIG. 1A.

Controller 520 may lower temperatures by controlling tempering air blower 500 to increase flow of tempering air stream 502 (e.g., opening valves in tubing, ductwork, etc., connecting tempering air stream 502 to exhaust system 400 section(s), rotating tempering air blower 500 fans more, etc.) and raise temperatures by controlling tempering air blower 500 to decrease flow. Alternatively, tempering air flow 502 may be controlled manually by operators. Such operators may read temperature gauges in exhaust system 400 sections and adjust tempering air stream 502 appropriately.

With continuing reference to FIG. 3, tempering air flows 504 and 506 may also be used to inject tempering air into the exhaust system 400. Alternatively, in embodiments the ammonia (or other) reagent is diluted using a dedicated stream of tempering air 504 shown in FIG. 3. In some cases when anhydrous ammonia is used as a precursor for the ammonia reagent its evaporation takes place in a storage tank and ammonia vapors are transferred from the tank to a flow control skid. These vapors must be diluted prior to injection into the exhaust system 400. In the conventional art, a separate designated blower provides the required dilution media flow. The need for this blower is eliminated through the use of tempering air stream 504. The tempering air stream 502, or a portion thereof, may also be added to the diluting air stream 504 used to dilute the reagent concentration. The manifold 420, or other mechanism, may be employed to distribute the ammonia reagent and tempering air streams 502 and 504 into post-oxidation section 422. However, a separate manifold or set of manifolds may be used to distribute tempering air stream 502.

With reference now to FIG. 4, schematically illustrated is another component of embodiments of exhaust system 400, reagent evaporation and flow control skid 600. In embodiments, the reagent (e.g., ammonia reagent) is vaporized using a dedicated stream of tempering air stream 506 shown in FIG. 3. To evaporate aqueous ammonia, tempering air stream 506 may be supplied to ammonia vaporizer 602 using connection 604 shown in FIG. 4. Tempering air stream 506 may be heated up externally or inside the vaporizer 602 utilizing electrical heater controlled by the heater control panel 606. Aqueous ammonia flow is controlled by valves 610. A controlled portion of aqueous ammonia is injected into the vaporizer 602 and exposed to hot air and evaporated. Evaporated ammonia reagent may be mixed with diluting air stream 504 (e.g., and tempering air stream 502) and injected into the exhaust system 400.

A simple cycle power plant system designed and operated in accordance with the embodiments of exhaust system 400 described herein increases the operating range of emissions control catalyst and in particular maximizes efficiency of the oxidation catalyst employed to reduce CO/unburned hydrocarbons/volatile organic carbons emissions and the reduction catalyst employed to reduce $NO_x$ emissions by the means of injecting designated streams of tempering air into exhaust gas ductwork. Embodiments of exhaust system 400 reduce capital and operating costs, reduce size of the simple cycle power plant exhaust systems and minimizes energy required to treat the exhaust gas (e.g., by reducing the pressure drop). Embodiments of exhaust system 400 also simplify arrangement of the ammonia flow control skid by eliminating blowers on ammonia flow control skids and utilizing tempering air as a dilution media for ammonia vapors. Embodiments of exhaust system 400 include mechanical equipment required for splitting tempering air flow into multiple streams which serve as combined cooling media for the exhaust flue gas and dilution gas for ammonia vapors including a control system which allows proper adjustment of tempering air stream flows. The operating temperature of the oxidation catalyst is maintained at the higher temperature then the operating temperature of the reduction catalyst.

Figure 5:
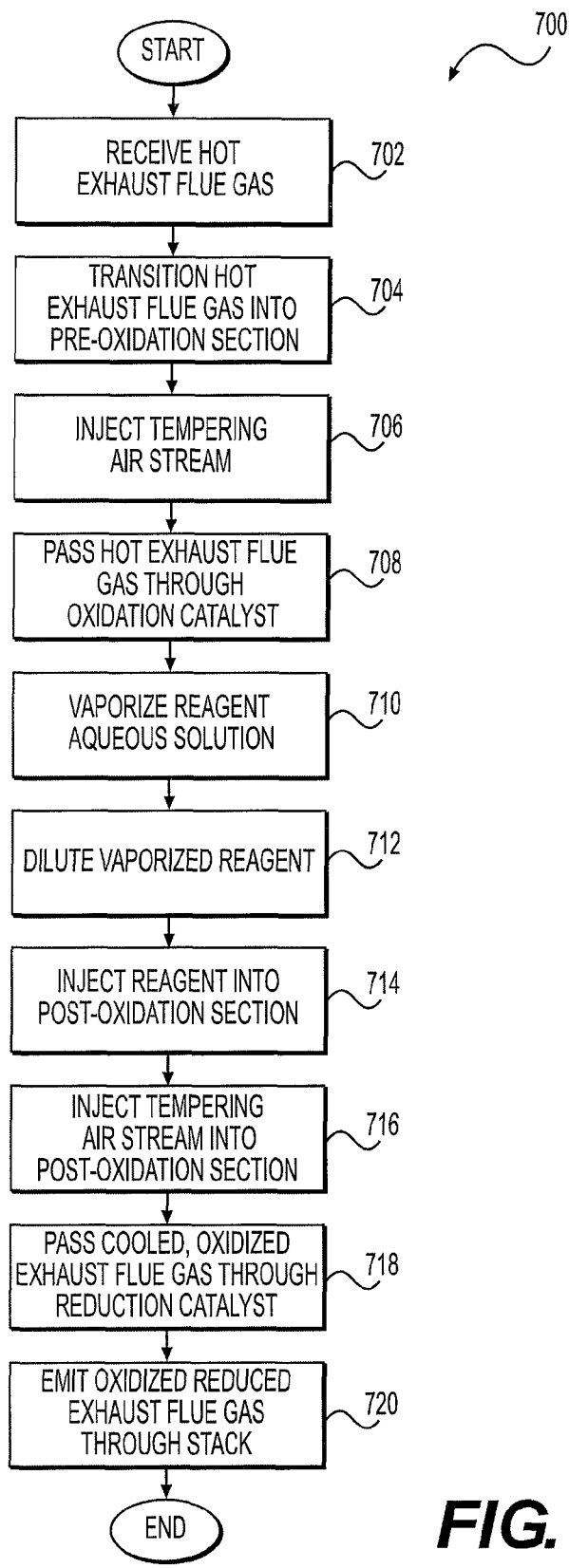
FIG. 5 is a flowchart illustrating an embodiment of an improved, integrated exhaust gas cooling method.

With reference now to FIG. 5, shown is a flowchart illustrating an embodiment of an integrated exhaust gas cooling method 700. The method 700 may include receiving hot exhaust flue gas, block 702, transitioning hot exhaust flue gas into pre-oxidation section of exhaust system, block 704, optionally injecting tempering air stream, provided by tempering air blower, into hot exhaust flue gas to ensure exhaust flue gas temperature optimized for oxidation process, block 706, passing hot exhaust flue gas through oxidation catalyst, block 708, vaporizing reagent aqueous solution with tempering air stream provided by tempering air blower, block 710, diluting vaporized reagent with tempering air stream provided by tempering air blower, block 712, injecting reagent into post-oxidation section of exhaust system, block 714, injecting tempering air stream, provided by tempering air blower, into post-oxidation section of exhaust system downstream from oxidation catalyst to provide a cold temperature zone in which oxidized exhaust flue gas is cooled to a temperature optimized for reduction process, block 716, passing cooled, oxidized exhaust flue gas through reduction catalyst, block 718, emitting oxidized, reduced exhaust flue gas through stack, block 720. As discussed above, by operation of method 700, temperature range of exhaust flue gas temperature in which oxidation catalyst operates is greater than temperature range of exhaust flue gas temperature in which reduction catalyst operates. In other words, temperature of exhaust flue gas passing through reduction catalyst is less than temperature of exhaust flue gas passing through oxidation catalyst by virtue of injection 716 of tempering air stream into post-oxidation section of exhaust system.

While various embodiments of the present invention have been described in detail, it is apparent that modifications and adaptations of those embodiments will occur to those skilled in the art. However, it is to be expressly understood that such modifications and adaptations are within the spirit and scope of the present invention.

Although the new arrangement of tempering air system and simple cycle power plant have been described in connection with the preferred arrangement of the simple cycle power plant and modifications to that arrangement, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An integrated exhaust gas cooling system comprising:
    an expansion joint linking the integrated exhaust gas cooling system to an upstream source of exhaust gas;
    a pre-oxidation section through which exhaust gas travels, equipped with a flow straightening device, wherein a hot temperature zone in which the exhaust gas is maintained at a temperature in a temperature range that is optimal for an oxidation process extends through the pre-oxidation section;
    an CO oxidation catalyst, in the hot temperature zone extending from the pre-oxidation section and downstream from the pre-oxidation section to a tempering air injection point, wherein the exhaust gas passes through the oxidation catalyst;
    a post-oxidation section downstream of the oxidation catalyst and through which the oxidized exhaust gas passes, wherein a tempering air stream is injected into the post-oxidation section to create a cool temperature zone that extends through the post-oxidation section and in which the oxidized exhaust gas is cooled below the temperature in the hot temperature zone and to a temperature in a temperature range that is optimal for a reduction process; and
    a $NO_x$ reduction catalyst, in the cool temperature zone extending from the post-oxidation section and downstream from the post-oxidation section, wherein the oxidized exhaust gas passes through the reduction catalyst.

2. The system of claim 1 further comprising a tempering air blower that provides the tempering air stream injected into the post-oxidation section.

3. The system of claim 2 wherein the tempering air blower provides a separate tempering air stream that is injected into the pre-oxidation section.

4. The system of claim 2 further comprising a manifold operatively connected to the tempering air blower and through which the tempering air stream is injected.

5. The system of claim 4 further comprising an ammonia injection grid in the post-oxidation section through which an ammonia reagent and the tempering air stream are injected into the post-oxidation section.

6. The system of claim 5 further comprising an ammonia evaporation and flow control skid operatively connected to the manifold.

7. The system of claim 6 wherein the tempering air blower provides a vaporizing air stream to the ammonia evaporation and flow control skid to vaporize aqueous ammonia.

8. The system of claim 6 wherein the tempering air blower provides a diluting air stream to the ammonia evaporation and flow control skid to dilute vaporized ammonia.

9. The system of claim 1 further comprising a transition section connecting expansion joint to pre-oxidation section, wherein transition section expands the cross-section of the integrated exhaust gas cooling system and hot temperature zone extends through transition section.

10. The system of claim 9 further comprising a perforated plate at connection of transition section and pre-oxidation section, wherein exhaust gas passes through perforated plate.

11. The system of claim 1 in which substantially all tempering air is injected downstream from the oxidation catalyst.

12. The system of claim 1 in which the source of the exhaust gas is a single cycle power plant.

13. An integrated exhaust gas cooling method comprising:
    receiving hot exhaust flue gas;
    transitioning hot exhaust flue gas into pre-oxidation section of exhaust system;
    passing hot exhaust flue gas through oxidation catalyst;
    injecting tempering air stream, provided by tempering air blower, into post-oxidation section of exhaust system downstream from oxidation catalyst to provide a cold temperature zone in which oxidized exhaust flue gas is cooled to a temperature optimized for reduction process;
    passing cooled, oxidized exhaust flue gas through reduction catalyst, wherein temperature of oxidized exhaust flue gas passing through reduction catalyst is less than temperature of exhaust flue gas passing through oxidation catalyst by virtue of injection of tempering air stream into post-oxidation section of exhaust system; and
    emitting clean exhaust gas, in which some exhaust gas components are oxidized and some of exhaust gas components are reduced, through a stack into the ambient atmosphere.

14. The method of claim 13 further comprising vaporizing reagent aqueous solution with tempering air stream provided by tempering air blower.

15. The method of claim 13 further comprising diluting vaporized reagent with tempering air stream provided by tempering air blower.

16. The method of claim 13 further comprising injecting reagent into post-oxidation section of exhaust system.

17. The method of claim 16 wherein injecting reagent and injecting tempering air stream into post-oxidation section of exhaust system is performed using same manifold and injection grid.

18. The method of claim 13 further comprising injecting tempering air stream, provided by tempering air blower, into heated exhaust flue gas to ensure exhaust flue gas temperature optimized for oxidation process.

* * * * *